United States Patent [19]

Kinoshita et al.

[11] 4,115,632

[45] Sep. 19, 1978

[54] METHOD OF PREPARING ELECTROLYTE FOR USE IN FUEL CELLS

[75] Inventors: Kimio Kinoshita; John P. Ackerman, both of Downers Grove, Ill.

[73] Assignee: The United States of America as represented by the United States Department of Energy, Washington, D.C.

[21] Appl. No.: 794,295

[22] Filed: May 5, 1977

[51] Int. Cl.$^2$ .................. H01M 8/00; H01M 8/14
[52] U.S. Cl. .................. 429/188; 429/46; 429/189; 264/115; 264/122; 264/123; 423/119; 423/421; 427/115; 427/215; 427/399
[58] Field of Search .................. 252/62.2; 429/12, 16, 429/46, 103, 112, 188, 189; 427/115, 215, 399; 423/421, 119; 264/115, 122, 123

[56] References Cited

U.S. PATENT DOCUMENTS

| | | | |
|---|---|---|---|
| 2,276,188 | 3/1942 | Greger | 429/46 |
| 3,257,239 | 6/1966 | Schultz et al. | 75/208 R |
| 3,362,846 | 1/1968 | Lee et al. | 427/215 |
| 3,819,813 | 6/1974 | Jones et al. | 423/421 |
| 4,009,321 | 2/1977 | Baker et al. | 429/46 |

FOREIGN PATENT DOCUMENTS

| | | | |
|---|---|---|---|
| 853,829 | 10/1970 | Canada | 429/46 |
| 1,207,144 | 9/1970 | United Kingdom | 429/46 |
| 1,129,883 | 10/1968 | United Kingdom | 429/46 |

*Primary Examiner*—Michael F. Esposito
*Attorney, Agent, or Firm*—Dean E. Carlson; Frank H. Jackson; Hugh W. Glenn

[57] ABSTRACT

An electrolyte compact for fuel cells includes a particulate support material of lithium aluminate that contains a mixture of alkali metal compounds, such as carbonates or hydroxides, as the active electrolyte material. The porous lithium aluminate support structure is formed by mixing alumina particles with a solution of lithium hydroxide and another alkali metal hydroxide, evaporating the solvent from the solution and heating to a temperature sufficient to react the lithium hydroxide with alumina to form lithium aluminate. Carbonates are formed by reacting the alkali metal hydroxides with carbon dioxide gas in an exothermic reaction which may proceed simultaneously with the formation with the lithium aluminate. The mixture of lithium aluminate and alkali metal in an electrolyte active material is pressed or otherwise processed to form the electrolyte structure for assembly into a fuel cell.

11 Claims, No Drawings

METHOD OF PREPARING ELECTROLYTE FOR USE IN FUEL CELLS

CONTRACTUAL ORIGIN OF THE INVENTION

The invention described herein was made in the course of, or under, a contract with the U.S. ENERGY RESEARCH AND DEVELOPMENT ADMINISTRATION.

BACKGROUND OF THE INVENTION

The present invention relates to the preparation of electrolyte materials and structures for use in molten-electrolyte fuel cells. Active electrolyte materials such as the alkali metal carbonates, hydroxides and oxides as well as mixtures of these materials are contemplated. Ceramic support materials such as the alkali metal aluminates are employed to provide inert particles as a substrate, or binder material for retention of the active electrolyte within the fuel cell between the anode and cathode.

Although the present invention may have application in a large variety of fuel cells, e.g., the hydrogen-to-oxygen fuel cell employing alkali metal hydroxide electrolyte, it is particularly suited for preparing electolyte structures such as compacts or pastes for fuel cells using molten carbonate mixtures as electrolyte. Fuel cells employing molten carbonate electrolyte can accept various carbonaceous gases as fuels. For example, methanol and carbon monoxide along with hydrogen have been proposed. One source of a fuel gas is that produced in the gasification of coal. This product gas includes carbon dioxide, carbon monoxide and hydrogen. In such a cell the following reactions can occur. At the anode:

$$H_2 + CO_3^= \rightarrow CO_2 + H_2O + 2e^-$$

$$CO + CO_3^= \rightarrow 2CO_2 + 2e^-$$

At the cathode:

$$2e^- + CO_2 + \tfrac{1}{2}O_2 + 2e^- \rightarrow CO_3^=$$

The carbon dioxide gas required at the cathode can be provided from that produced at or delivered to the anode.

The active electrolyte material is generally provided as a mixture of molten alkali metal carbonates at the cell operating temperature. Considerable reduction in melting temperatures can be obtained by using eutectics and other molten mixtures of the carbonates. Table I lists electrolytes that have been suggested by Janz and Lorenz *J. Chem. Eng. Data* 6 (3), 321-323 (1961) and Reisman, *J. Am. Chem. Soc.* 81, 807-811 (1959).

TABLE I

| System | Mole Percent A | B | C | Melting Point, K |
|---|---|---|---|---|
| Li$_2$CO$_3$(A) | | | | 999 |
| Na$_2$CO$_3$(B) | | | | 1131 |
| K$_2$CO$_3$(C) | | | | 1172 |
| LiKCO$_3$ | 50.0 | 50.0 | 0 | 777.5 |
| Li$_2$CO$_3$—K$_2$CO$_3$ | 42.7 | 0 | 57.3 | 771 |
| Li$_2$CO$_3$—K$_2$CO$_3$ | 62.0 | 0 | 38.0 | 740–761 |
| Li$_2$CO$_3$—Na$_2$CO$_3$ | 52.0 | 48.0 | 0 | 774 |
| Li$_2$CO$_3$—Na$_2$CO$_3$—K$_2$CO$_3$ | 43.5 | 31.5 | 25.0 | 670 |
| Na$_2$CO$_3$—K$_2$CO$_3$ | 0 | 56 | 44 | 983 |

Molten alkali carbonate compositions other than eutectics are also contemplated for use in fuel cells that operate at temperatures of about 650°–700° C. (923–973 K).

Molten carbonate fuel cells have been suggested as stacks of repeating elements. Each element contains an anode, a cathode with an electrolyte structure or compact separating the two. Anode structures can include porous, sintered nickel possibly alloyed with chromium or cobalt. Suitable means of current collection and an electrically conductive separator plate between the anode and the next cell in the stack are incorporated. Cathodes of similar structure are contemplated of, for instance, porous nickel oxide prepared within the cell by oxidation of sintered nickel structures. The electrolyte structure disposed between the electrodes includes the active electrolyte material of alkali metal carbonates along with an inert, matrix or substrate material. The alkali metal aluminates, particularly lithium aluminate are currently of interest for use as this inert substrate material. The formation of lithium aluminate is favored relative to sodium or potassium aluminate because of its greater stability.

Structural strength and electrolyte retention are closely related to the shape and size of the aluminate particle. A preferred shape for lithium aluminate particles appears to be that of long rods or fibers. Such fibers combine strength with small interstitial dimensions within the electrolyte structure to hold the liquid electrolyte by surface forces.

One method used in the preparation of electrolyte structures involves reaction of finely divided alumina with alkali metal carbonates at temperatures around 900 K. To obtain complete reaction to the desired rod-shaped particles, it has been found that the repetitive steps of cooling, grinding, blending in more alkali carbonates and reheating to reaction temperatures are required over a number of cycles. This complex and repetitive procedure is followed by pressing at 20 to 60 MPa and 720–770 K. Even with this difficult and complex procedure, one cannot ensure preparation of the desired elongated rods of lithium aluminate. Other morphologies such as square bipyramidal particles of gamma lithium aluminate, platelets of alpha and beta lithium aluminate and clumps of either alpha or beta lithium aluminate are sometimes observed.

Therefore, in view of these problems associated with the prior art methods of preparing electrolyte materials for fuel cells, it is an object of the present invention to provide an uncomplicated method for producing rod-shaped particles of lithium aluminate for use as a matrix and support for active electrolyte material.

It is a further object to provide a method for producing such material at reduced temperatures.

It is also an object to provide flexibility in electrolyte preparation to permit completion after cell assembly.

SUMMARY OF THE INVENTION

The present invention involves a method of preparing electrolyte material including a support material of rod-shaped lithium aluminate particles in mixture with alkali metal compounds as the active electrolyte material. The method includes contacting alumina particles with a solution of lithium cations, cations of a second alkali metal and an oxygen-contained anion. The solution is evaporated from the particles to leave them impregnated and coated with a mixture of alkali metal compounds including a lithium compound. These particles are maintained at a temperature sufficient to react the lithium compound with alumina to form lithium aluminate particles having an elongated, rod-shaped morphology.

In a more specific aspect of the invention, the lithium compound within the alumina particles is lithium hydroxide or oxides of lithium for reaction with the alumina to form lithium aluminate.

In another embodiment of the present method the reaction of lithium hydroxide with alumina can be carried out in the presence of carbon dioxide gas. The exothermic reaction of the carbon dioxide gas with the alkali metal hydroxides, forms alkali metal carbonates and provides heat to promote the formation of the lithium aluminate. The incorporation of the second alkali metal hydroxide within the mixture reduces the melting point of both the hydroxide and carbonate salt mixtures to provide a liquid phase for enhancing formation of rod-shape, lithium aluminate particles.

DETAILED DESCRIPTION OF THE PREFERRED EMBODIMENT

In one manner of carrying out the method of the present invention a slurry of alumina powder is formed and a concentrated solution of alkali metal hydroxides including lithium hydroxide are added to the slurry. The alumina powder typically is smaller than the diameter of the desired lithium aluminate particles. The lithium aluminate particles are advantageously produced in rod or fiber shape. The rods or fibers can have diameters of less than about 1 micrometer and lengths of at least more than 2 micrometers. Fibers up to and beyond 10 micrometers in length are appropriate for use.

Although various allotropic forms of alumina can be selected, gamma alumina appears to be preferred because it is easily provided with higher surface area per unit mass than other allotropic forms. For example, gamma alumina may be obtained with a surface area of 80-100 square meters per gram while other alumina allotropes generally are available with only a fraction of that area per unit mass.

The alkali metal hydroxides will include lithium hydroxides in mixture with a second alkali metal hydroxide. Potassium hydroxide, sodium hydroxide, rubidium hydroxide, cesium hydroxide or a mixture of more than one of these compounds with lithium hyroxide can be selected. The composition of the original alkali metal hydroxide solution is determined by the quantity of lithium aluminate to be produced and the desired electrolyte's composition. For example, Table I above shows various eutectic compositions of several alkali metal carbonates. Other mixtures of alkali metal compounds including rubidium and cesium compounds, and other than eutectic mixtures may also serve as electrolytes. It will be clear that the amount of lithium hydroxide included will be sufficient to provide lithium in the resulting lithium aluminate and to supply lithium to the desired electrolyte composition.

The slurry of alumina with alkali metal hydroxides is evaporated to near dryness resulting in alumina particles impregnated and coated with alkali metal hydroxides including lithium hydroxide. Even at temperatures near 100° C. some reaction of the lithium hydroxide with alumina to form lithium aluminate may occur in accordance with the following reaction:

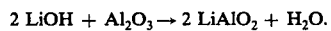

However, in order to cause the reaction to proceed at a practical rate, temperatures of and in excess of about 200° C. should be employed. During the original formation of the lithium aluminate that is during about the first 4 hours temperatures of 450° C. or less preferably are used to ensure production of the rod-shaped lithium aluminate morphology. The inventors have found that this shape is most likely associated with the beta lithium aluminate allotrope. It is believed that temperatures greatly in excess of this level during early formation such as 600° C. and above used in the prior art methods may encourage the production of other lithium aluminate allotropes and shapes such as alpha or beta platelets, alpha or beta clumps or gamma bipyramidal forms. One advantage of employing the mixture of lithium hydroxide with other alkali metal hydroxides is that at these temperatures, i.e., 200°-450° C., a liquid phase of alkali metal hydroxides including lithium hydroxide is available for contacting and reacting with the porous alumina particles. The likelihood of a liquid phase is increased by the presence of water remaining from the original solution and produced in lithium aluminate formation.

One method of heating the impregnated and coated alumina particles to the reaction temperature is to contact these particles with carbon dioxide gas. The carbon dioxide will react with a portion of the alkali metal hydroxides to form alkali metal carbonates. The exothermic carbonation reaction is as follows:

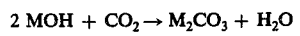

where M is an alkali metal. This reaction is exothermic and can supply the heat and temperature increase needed for the formation of lithium aluminate. This step is of particular advantage when the desired electrolyte is to include alkali metal carbonates.

It is contemplated that this carbonation and aluminate formation step can be combined with the previously discussed evaporation step, for example by spray drying the slurry of alumina particles in solution of alkali metal hydroxides into a carbon dioxide atmosphere. Reaction time can be increased by retaining the particles in a fluidized bed in contact with the desired gas flow. However, since the alkali metal carbonates have melting points exceeding those of the alkali metal hydroxides, it may be desirable to control the rate of carbonation at a low level in respect to the rate of lithium aluminate formation to ensure that lithium hydroxide is present in a liquid phase within the desired temperature range for the formation of the rod-shaped particles of beta lithium aluminate. This can be accomplished for example by limiting the reaction temperature or possibly the flow of carbon dioxide gas into contact with the alumina particles. If necessary, suitable and empirical sampling techniques can be devised for use during the course of the reaction to provide control guidelines.

This procedure admits some flexibility because the carbonation reaction need not be completed before or at the same time that the formation of lithium aluminate is ended. After the lithium aluminate has been formed, additional carbonation can be accomplished at elevated temperatures. Final carbonation can even be carried out within the assembled fuel cell as both the fuel and oxidant gases can contain carbon dioxide.

In one other manner of preparing the electrolyte material, the alumina particles impregnated and coated with alkali metal hydroxides can be heated in air to a suitable temperature of 200°-450° C. in the absence of other than atmospheric carbon dioxide gas. After formation of most of the desired lithium aluminate, the material can then be contacted with carbon dioxide gas to convert the remaining alkali metal hydroxide to carbonate.

The amount of lithium aluminate produced in mixture with the active electrolyte material will be an amount effective to impart good strength to the resulting electrolyte structure. In addition, sufficient lithium aluminate is included to provide small interstitial distances such that the molten electrolyte is retained within the structure. One other limiting consideration is that of including sufficient active electrolyte for operation of the fuel cell. For most electrolyte structures these requirements can be met by providing a final composition including about 30 to 60 weight percent lithium aluminate and about 40 to 70 weight percent active electrolyte, i.e., alkali metal carbonates or alkali metal hydroxides.

Although the electrolyte material can be used in particle or a paste form its structural integrity is enhanced by various fabrication methods. The mixture of alkali metal compounds for instance can be pressed in a die to form a compact, cast into a mold, sintered to greater density, extruded into a desired shape or rolled into a sheet or ribbon. Such fabrication methods can be performed with a mixture of alkali metal hydroxides and alumina prior to aluminate formation or carbonation, with a mixture of lithium aluminate and alkali metal hydroxides prior to carbonation, or with a mixture of lithium aluminate and alkali metal carbonates. In many of these procedures, particularly those which handle the materials in solid and semisolid states, the alkali metal compounds can be comminuted and classified to desired agglomerate sizes before the electrolyte structure is formed. Also, it will be clear that the present invention contemplates formation of lithium aluminate and carbonation of alkali metal compounds both before and after fabrication of the electrolyte structure.

In a more detailed method of preparing a suitable electrolyte structure or compact, the material as formed as comminuted to agglomerate sizes appropriate to the pressing or other fabrication method being used. For instance, particles of less than about 100 micrometers are appropriate for pressing within a die. This resulting particulate material is then hot pressed at a temperature slightly below the melting point of the alkali metal compounds, e.g., about 450°–500° C. for carbonates, 200°–250° C. for the hydroxides, or temperature in between these ranges for hydroxide-carbonate mixtures. The pressing can be performed at pressures of about 20–60 MPa (about 200–600 atmospheres). The compact is then assembled within a fuel cell between an anode and a cathode within a stack of electrodes where the electrolyte becomes molten at cell operating temperatures. When carbon dioxide gas is present within the cell at these elevated temperatures, alkali metal hydroxides within the compact will be carbonated. If alumina is present, it can also react with lithium hydroxides within the electrolyte to complete formation of the lithium aluminate.

In one procedure, a compact can be formed of lithium aluminate in mixture with alkali metal hydroxides. Carbonation can thus proceed in a suitable carbon dioxide atmosphere or flow, for instance within the assembled fuel cell.

In one other contemplated procedure, alumina particles impregnated with alkali metal hydroxides including lithium hydroxide can be pressed into a compact and assembled within a fuel cell between anode and cathode structures. Upon operation of the fuel cell, carbon dioxide supplied and produced within the reactant gases will react with the alkali metal hydroxides to produce carbonates and heat. Lithium aluminate is formed within the assembled fuel cell by reaction of the lithium hydroxide with alumina.

The following examples are presented to further illustrate the present invention:

EXAMPLE I

Gamma alumina of about 0.02 micrometers average particle size was slurried in water and blended with a concentrated solution of lithium hydroxide and potassium hydroxide. The solution was evaporated to near dryness leaving particles of alumina impregnated and coated with a mixture of lithium and potassium hydroxide. The impregnated and coated particles at about 25° C. are contacted with a flow of carbon dioxide gas (at 25° C.) to convert the hydroxides to the carbonates. The heat produced by the exothermic reaction between $CO_2$ and the alkali metal hydroxides was sufficient to elevate the temperature to between 100° and 300° C. and cause the alumina to react with the lithium hydroxide to produce rod-shaped particles of lithium aluminate. After approximately 4 hours reaction time, the temperature was increased to 600° C. for 17 hours to remove product water. Sufficient amounts of lithium hydroxide, potassium hydroxide, and alumina were originally included to provide a final mixture of 45 wt % lithium aluminate and 55 wt % alkali metal carbonates. Within the alkali metal carbonates the eutectic composition of 62 mole % lithium carbonate and 38 mole % potassium carbonate was obtained. This mixture was comminuted to pass 100 micrometers classification and pressed at 480° C. and 40 MPa into an electrolyte compact.

EXAMPLE II

The procedure of Example I was employed except that the reaction temperature during both the carbonation and formation of the lithium aluminate was controlled between 200°–450° C. for a period of 16 hours. Rod-shaped particles of lithium aluminate were obtained.

EXAMPLE III

Particles of alumina impregnated and coated with alkali metal hydroxides, including lithium hydroxide and potassium hydroxide, were heated to about 450° C. in air for about 1½ hours. The lithium hydroxide and alumina reacted to form rod-shaped particles of lithium aluminate. The solid mixture of lithium aluminate and alkali metal hydroxides was comminuted to 60–120 microns agglomerate size and pressed at 40 MPa pressure (200° C.) into an electrolyte structure for assembly within a fuel cell. The alkali metal hydroxides were carbonated by reaction with carbon dioxide gas after assembly within the fuel cell.

EXAMPLE IV

The procedure in Example III is performed except that the solid mixture of lithium aluminate and alkali metal hydroxides are contacted with carbon dioxide gas at temperatures above the melting point of the mixture, that is above about 200°C. for about 10 hours to convert the hydroxides to alkali metal carbonates. The resulting solid mixture of lithium aluminate and alkali metal carbonates is comminuted to suitable agglomerate size and hot pressed into a compact at about 10° C. below the melting temperature of the mixture, e.g. about 400°–500° C.

EXAMPLE V

Alumina particles impregnated with lithium hydroxide and sodium hydroxide are formed into a compact at about 250° C. and a pressure of about 40 MPa. The compact is assembled between anode and cathode structures within a fuel cell where lithium aluminate is formed when temperatures of in excess of 200° C. are produced by the reactions of the fuel and oxidant gases at the fuel cell electrodes. The alkali metal hydroxides are converted to carbonates by reaction with carbon dioxide gas in the oxidant and fuel gases.

EXAMPLE VI

The procedure of Example V is followed except that the assembled fuel cell is operated with hydrogen gas free of oxides of carbon at the anode and air or oxygen free of oxides of carbon at the cathode. Lithium hydroxide within the electrolyte reacts with alumina to form lithium aluminate as rod-shaped particles at temperatures of 200°–450° C. but the remaining active electrolyte material remains as alkali metal hydroxides for use with the hydrogen-oxygen fuel cell.

EXAMPLE VII

The procedures of the above examples are followed except that lithium hydroxide in mixture with one or more of the alkali metal hydroxides including potassium hydroxide, sodium hydroxide, rubidium hyroxide and cesium hydroxide are impregnated into and coated on the alumina particles.

It will be clear from the above examples that the present invention provides a flexible method for forming inert support material for use in electrolyte structures adapted for fuel cell operation. Such structures formed by this method can be used in hydrogen-oxygen fuel cells or in fuel cells that consume various carbonaceous gases including coal gas containing both hydrogen and carbon monoxide. The method results in a structure of rod-shaped, lithium aluminate particles that provide good integrity to the support matrix as well as good retention of the molten alkali metal carbonates or hydroxides used as electrolyte.

The embodiments of the invention in which an exclusive property or privilege is claimed are defined as follows:

1. A method of preparing an electrolyte for use in a fuel cell, said electrolyte including alkali metal compounds and a support material of rod-shaped, lithium-aluminate particles, the method comprising:
    contacting alumina particles with a solution including a mixture of hydroxides of lithium and cations of a second alkali metal;
    evaporating the solvent from said solution to form alumina particles impregnated and coated with said mixture of alkali metal compounds; and
    maintaining said alumina particles at a temperature of 100°–450° C. to react lithium hydroxide with alumina to form rod-shaped lithium aluminate particles.

2. The method of claim 1 wherein lithium hydroxide is reacted with the alumina particles at a temperature sufficient to provide a liquid phase of the alkali metal compounds.

3. The method of claim 1 wherein said alkali metal compounds are converted to alkali metal carbonates.

4. The method of claim 3 wherein said alkali metal compounds impregnated within said alumina particles are lithium hydroxide, in mixture with one or more of the alkali metal hydroxides, selected from potassium hydroxide, sodium hydroxide, rubidium hydroxide and cesium hydroxide and wherein said alkali metal compounds are reacted with carbon dioxide gas to form the corresponding alkali metal carbonates.

5. The method of claim 1 wherein said alumina particles contain lithium hydroxide in liquid state with water and another alkali metal hydroxide, and wherein said lithium hydroxide reacts with alumina to form rod-shaped, beta lithium aluminate particles.

6. The method of claim 1 wherein said mixture of lithium aluminate and alkali metal compounds are pressed into a compact comprising particles of lithium aluminate contacting the alkali metal compounds at a temperature below the melting point of the alkali metal compounds.

7. The method of claim 6 wherein prior to said pressing step, said mixture of lithium aluminate and alkali metal compounds are comminuted and classified to particles of less than about 100 micrometers and wherein said lithium aluminate is of a shape characterized by rod-shaped particles of more than 2 micrometers length and less than 1 micrometer diameter.

8. The method of claim 1 wherein said alkali metal compounds in contact with said alumina particles include alkali metal hydroxides and said hydroxides are reacted with carbon dioxide gas to form alkali metal carbonates in an exothermic reaction to provide at least a part of the heat needed for maintaining said alumina particles at a temperature sufficient to react lithium hydroxide with alumina in the formation of lithium aluminate.

9. The method of claim 1 wherein a solution of lithium hydroxide along with other alkali metal hydroxides in contact with alumina particles is evaporated to dryness in an atmosphere of carbon dioxide gas and heated to a temperature in excess of 200° C. until a solid mixture of lithium aluminate and alkali metal carbonates is formed, the solid mixture is comminuted and classified to particles of less than 100 micrometers and pressed at a temperature of about 10° C. below the melting point of the alkali metal carbonates in the mixture to form an electrolyte compact comprising a support structure of beta lithium aluminate particles of rod shape impregnated and coated with a mixture of lithium carbonate with other alkali metal carbonates and said compact is assembled within a fuel cell between an anode and cathode and heated to a temperature sufficient to form a molten carbonate salt within said lithium aluminate structure.

10. The method of claim 1 wherein said alumina particles are immersed within a solution containing lithium hydroxide along with other alkali metal hydroxides; the solution is evaporated to dryness and the alumina particles with alkali metal hydroxides are heated to about 450° C. to form particles of lithium aluminate in mixture with alkali metal hydroxides including lithium hydroxide; said lithium aluminate and alkali metal hydroxides are comminuted, classified and pressed into a compact having a support structure of rod-shaped lithium aluminate particles contacting alkali metal hydroxides, said compact is contacted with carbon dioxide gas to react with said alkali metal hydroxides and form a mixture of alkali metal carbonates in contact with the lithium aluminate particles.

11. The method of claim 1 wherein alumina particles are coated and impregnated with a mixture of alkali metal hydroxides including lithium hydroxide, the particles are pressed into a compact, said compact is assembled within a fuel cell intermediate an anode and a cathode and heated to a temperature sufficient to react lithium hydroxide with alumina to form rod-shaped lithium aluminate particles and said compact is contacted with carbon dioxide gas to convert said alkali metal hydroxides to alkali metal carbonates.

* * * * *